(12) United States Patent
Wan et al.

(10) Patent No.: US 10,358,759 B2
(45) Date of Patent: Jul. 23, 2019

(54) COMPOSITE BALANCE RING AND WASHING MACHINE

(71) Applicants: HAIER GROUP CORPORATION, Qingdao (CN); QINGDAO HAIER WASHING MACHINE CO., LTD., Qingdao (CN)

(72) Inventors: Guosheng Wan, Qingdao (CN); Jingli Yang, Qingdao (CN); Quancheng Feng, Qingdao (CN); Xian Zhang, Qingdao (CN); Changcheng Shao, Qingdao (CN)

(73) Assignees: HAIER GROUP CORPORATION, Shandong, Qingdao (CN); QINGDAO HAIER WASHING MACHINE CO., LTD., Shandong, Qingdao (CN)

( * ) Notice: Subject to any disclaimer, the term of this patent is extended or adjusted under 35 U.S.C. 154(b) by 158 days.

(21) Appl. No.: 15/504,543

(22) PCT Filed: Nov. 14, 2014

(86) PCT No.: PCT/CN2014/000058
§ 371 (c)(1),
(2) Date: Feb. 16, 2017

(87) PCT Pub. No.: WO2016/026224
PCT Pub. Date: Feb. 25, 2016

(65) Prior Publication Data
US 2017/0241062 A1    Aug. 24, 2017

(30) Foreign Application Priority Data

Aug. 20, 2014 (CN) .......................... 2014 1 0412993

(51) Int. Cl.
*D06F 37/24* (2006.01)
*F16F 15/36* (2006.01)

(52) U.S. Cl.
CPC ............ *D06F 37/245* (2013.01); *D06F 37/24* (2013.01); *F16F 15/366* (2013.01); *F16F 2230/0011* (2013.01)

(58) Field of Classification Search
None
See application file for complete search history.

(56) References Cited

U.S. PATENT DOCUMENTS

| 2011/0048081 A1* | 3/2011 | Urbiola Soto .......... D06F 37/12 68/212 |
| 2011/0247373 A1* | 10/2011 | Sharp ..................... D06F 23/04 68/131 |
| 2015/0233040 A1* | 8/2015 | Kim ...................... D06F 37/225 68/140 |

FOREIGN PATENT DOCUMENTS

| CN | 201390903 Y | 1/2010 |
| CN | 101962901 A | 2/2011 |

(Continued)

OTHER PUBLICATIONS

International Search Report (PCT/ISA/210) dated Apr. 17, 2015, by the State Intellectual Property Office of the P.R. China as the International Searching Authority for International Application No. PCT/CN2014/091151.

(Continued)

*Primary Examiner* — Jason Y Ko
*Assistant Examiner* — Cristi J Tate-Sims
(74) *Attorney, Agent, or Firm* — Buchanan Ingersoll & Rooney PC

(57) ABSTRACT

The present disclosure discloses a composite balance ring and a washing machine. The balance ring is internally hollow to form a chamber. The chamber is horizontally provided with a partition plate which divides the chamber into upper and lower chambers. The upper and lower chambers communicate through an overflow structure and a (Continued)

backflow structure, and the chamber is filled with balancing liquid with a level close to the partition plate. During the dehydration process of the washing machine, the balancing liquid in the lower chamber overflows into the upper chamber by a low overflow speed through a narrow gap that forms the overflow structure, and the balancing liquid remaining in the lower chamber provided with a counterweight force in the inner tub, so that the increase of eccentric displacement of the inner tub due to eccentric flowing of the balancing liquid is avoided.

9 Claims, 7 Drawing Sheets

(56) References Cited

FOREIGN PATENT DOCUMENTS

| CN | 202766860 U | 3/2013 | |
|----|----|----|----|
| JP | 52-89770 A | 7/1977 | |
| JP | 63-158336 A | 7/1988 | |
| JP | 04-187192 A | 7/1992 | |
| JP | 09-234295 A | 9/1997 | |
| WO | WO-9910583 A1 * | 3/1999 | ........... D06F 37/245 |

OTHER PUBLICATIONS

Written Opinion (PCT/ISA/237) dated Apr. 17, 2015, by the State Intellectual Property Office of the P.R. as the International Searching Authority for International Application No. PCT/CN2014/091151.

* cited by examiner

COMPOSITE BALANCE RING AND WASHING MACHINE

FIELD OF THE INVENTION

The present disclosure relates to an inner tub stabilization means of a washing machine, and more particularly, to a composite balance ring and washing machine.

BACKGROUND OF THE INVENTION

During the dehydration process, the washing machine often has a large vibration due to eccentric laundry placing, when the eccentricity value exceeds a certain limit, it will appear the problem of inner tub continuously hitting the casing and users complained a lot about this. Ordinary washing machines generally add balancing liquid into the balance ring to reduce the vibration. But if the amount of balancing liquid is added too many, at start-up of the dehydration process, the balance ring itself will also be eccentric, which is not conducive to the balance of the system.

Such as a Chinese patent application No. 201220447545.3 discloses a balance ring of a washing machine, comprises a lower balance ring and an upper balance ring snapped fit on the lower balance ring. The upper and lower balance rings are formed with a chamber for containing balancing liquid, balancing pieces are arranged radially in the chamber and the balancing pieces are arranged at equal intervals.

To avoid the eccentricity of the balance ring itself at start-up during the dehydration process which caused by over adding balancing liquid into the balance ring, the technicians also provide some improvement.

Such as a Chinese application patent No. 200910158225.9 discloses a balance means of a drum washing machine, the balance means consists of at least two annular chambers arranged coaxially with the drum at the edges of the drum. Wherein at least one of the chambers is a ball balance ring provided with roller balls and at least one of the chambers is a liquid balance ring provided with a flow balancing liquid. Using two different balancing matters comprising the roller balls and the balancing liquid, respectively, at least two balancing forces with at least two different reaction rate are generated, thereby the balance state of the drum of the washing machine rotating is improved during the dehydration process. However, a plurality of independent chambers which form the balance ring are filled with balancing matters with a certain weight in the scheme above. When the weight of the balancing matter reaches a certain value, the balancing matter in the balance ring will still produce eccentric force at start-up in the dehydration process, which is not conducive to the leveling of the instant of dehydration.

In view of the foregoing, the present disclosure is proposed.

SUMMARY OF THE INVENTION

The technical problem to be solved by the present disclosure is to overcome the defects of the prior art, and provides a composite balance ring with simple structure and low cost, so as to achieve the purpose of correcting the eccentricity of the inner tub during the dehydration of the washing machine.

In order to solve the technical problem, the basic idea of adopting the technical scheme is as follows. A composite balance ring is internally hollow to form a chamber, the chamber is horizontally provided with a partition plate which divides the chamber into an upper chamber and a lower chamber, the upper chamber and the lower chamber are communicated through an overflow structure and a backflow structure, and the chamber is filled with balancing liquid with a liquid level close to the partition plate.

Further, the overflow structure is arranged away from a center of the balance ring relative to the backflow structure.

Further, the overflow structure is an overflow gap formed between an outer periphery of the partition plate and a side wall of the chamber, so that the balancing liquid in the lower chamber can overflow to the upper chamber.

Further, an inner periphery of the partition plate is arranged next to a side wall of the chamber, it is also possible to provide a constant backflow gap between the inner periphery of the partition plate and the side wall of the chamber to form a backflow structure for returning the balancing liquid to the lower chamber.

Further, a backflow port which constitutes the backflow structure is provided near the inner periphery of the partition plate. Preferably, the partition plate is provided with an annular groove to form a flow passage for the balancing liquid overflowing to the upper chamber. Further preferably, the backflow port which constitutes the backflow structure is provided at a bottom of the annular groove, and the balancing liquid which overflows to the upper chamber flows back to the lower chamber through the backflow port.

Further, the backflow port is arranged at a bottom of the groove near the center of the balance ring.

Further, a balancing liquid level in the chamber is flush with the partition plate. Further, the balance ring is formed by snapping fit an upper case and a lower case, which form a chamber having a constant cross-sectional area.

Further, the lower chamber is provided with a plurality of lower retaining ribs arranged centrosymmetrically with respect to the balance ring. Preferably, the upper chamber is provided with a plurality of upper retaining bars arranged symmetrically with respect to the center of the balance ring. Further preferably, each of the upper retaining ribs and the lower retaining ribs are arranged staggeredly, and the upper retaining ribs and the lower retaining ribs extend radially in the balance ring.

Further, the partition plate arranged on the retaining ribs. Preferably, the lower retaining ribs are disposes radially along the lower chamber, and an upper portion of the lower retaining ribs is provided with an opening for passing the balancing liquid. Side edges of both sides of the opening respectively support the inner and outer peripheral portions of the partition plate, and the opening is provided in cooperation with the groove of the partition plate.

Further, a positioning structure is arranged between the partition plate and the lower case so that the partition plate is fixedly mounted on the retaining ribs.

Further, the positioning structure comprises a mounting pillar provided on the lower case and a mounting hole provided in the partition plate. The mounting pillar is cylindrical protrusion extending vertically upwardly from the bottom of the lower chamber, and the partition plate is arranged on the mounting pillar through the mounting hole to realize the horizontal positioning on the retaining ribs.

Further, the positioning structure comprises a mounting pillar provided on the lower case and a mounting hole provided in the partition plate to fixedly connected the partition plate with the lower case by a pin pattern.

Further, the mounting pillar is formed by a cylindrical protrusion extending vertically upwardly from the bottom of the lower chamber, the mounting hole is matched with the mounting pillar. And the mounting pillar is fixedly connected with the mounting hole by a pin pattern, so that the partition plate is positionally arranged on the retaining ribs.

Further, the lower chamber is provided with a plurality of mounting pillars arranged symmetrically with respect to the center of the balance ring, and the partition plate is provided with mounting holes which are respectively corresponding to mounting pillars for matching installation.

Another object of the present disclosure is to provide a washing machine with the composite balance ring mentioned above.

Further, the balance ring is installed at an opening in an upper portion of an inner tub of the washing machine.

The current washing machines with a balance ring providing eccentricity correction force with balancing liquid at start-up in the dehydration process are easily suffered the eccentric displacement of the inner tub due to the uneven distribution of the loads. The balance ring is driven to be eccentric and inclined, so that the balancing liquid in chamber of the balance ring is collected in the inclined direction, by which the eccentric displacement of the inner tub is increased, and the unbalance torque of the motor is increased when the inner tub is at start-up in the dehydration process.

When the washing machine equipped with the balance ring of the present disclosure is at start-up in the dehydration process, the balancing liquid in the lower chamber is collected in the inclined direction and overflow into the upper chamber through the overflow structure constituted by the gap between the outer periphery of the partition plate and the chamber. However, the gap constituting the overflow structure is narrow so that the overflow speed of the balancing liquid is relatively slow. Thus, the balancing liquid remaining in the lower chamber is provided with a counterweight force to the inner tub to avoid the occurrence of an increase in the eccentric displacement of the inner tub due to eccentric flow of the inner tub.

After the start-up of the dehydration, the balancing liquid left in the lower chamber rotates with the inner tub so that the balancing liquid flows close to the side wall of the chamber under the action of centrifugal force and the balancing liquid collected at the side wall of the chamber is discharged through the overflow structure to the upper chamber. As the dehydrating process of the washing machine, the balancing liquid in the lower chamber gradually overflows into the upper chamber and flows close to the outer sidewall of the partition plate to provide eccentricity correction force for the eccentricity of the inner tub. After completing of the dehydration process of the washing machine, the balancing liquid in the upper chamber is collected in the groove provided in the partition plate and returns to the lower chamber through the backflow port provided on the side wall of the groove near one side wall of the balance ring.

The present disclosure adds the partition plate to separate the chamber on the basis of the existing balance ring of washing machine, so as to realize the purpose that the balancing liquid in the balance ring respectively provides the counterweight function and the eccentricity correction function at start-up of the dehydration and in the dehydration process. The balance ring structure is simple, the manufacture process is simple, the design area is small and the cost is low. By installing the partition plate, the balance ring in the present disclosure is not limited by the balancing liquid volume, which solves the eccentric flow problem of the balancing liquid during the start-up of the dehydration process and improves the eccentricity correction effect of the inner tub during the dehydration process. Due to the partition plate arranged in the balance ring of the present disclosure, the balance ring has the function of being a counterweight of the washing machine. At the same time, the invention has a simple structure and remarkable effect and is suitable for promotion.

Specific embodiments of the present disclosure are further described below in detail with reference to the accompanying drawings.

Description of major components: 1—upper case, 2—lower case, 3—partition plate, 4—chamber, 11—filling port, 12—upper retaining rib, 21—lower retaining rib, 22—mounting pillar, 31—groove, 32—backflow port, 33—mounting hole, 41—upper chamber, 42—lower chamber, 43—overflow gap

DETAILED DESCRIPTION OF THE INVENTION

The following is further described in details with embodiments of the present disclosure.

A washing machine comprises an inner tub mounted in an outer tub with an axis at an acute angle or coincidence with a vertical direction, and a balance ring arranged at the upper opening of the inner tub.

As shown in from FIG. 1 to FIG. 5, the balance ring is composed of an upper case 1 and a lower case 2 which are snapped fit to each other to form an annular balance ring which cooperates with the opening of the inner tub.

Figure 1:
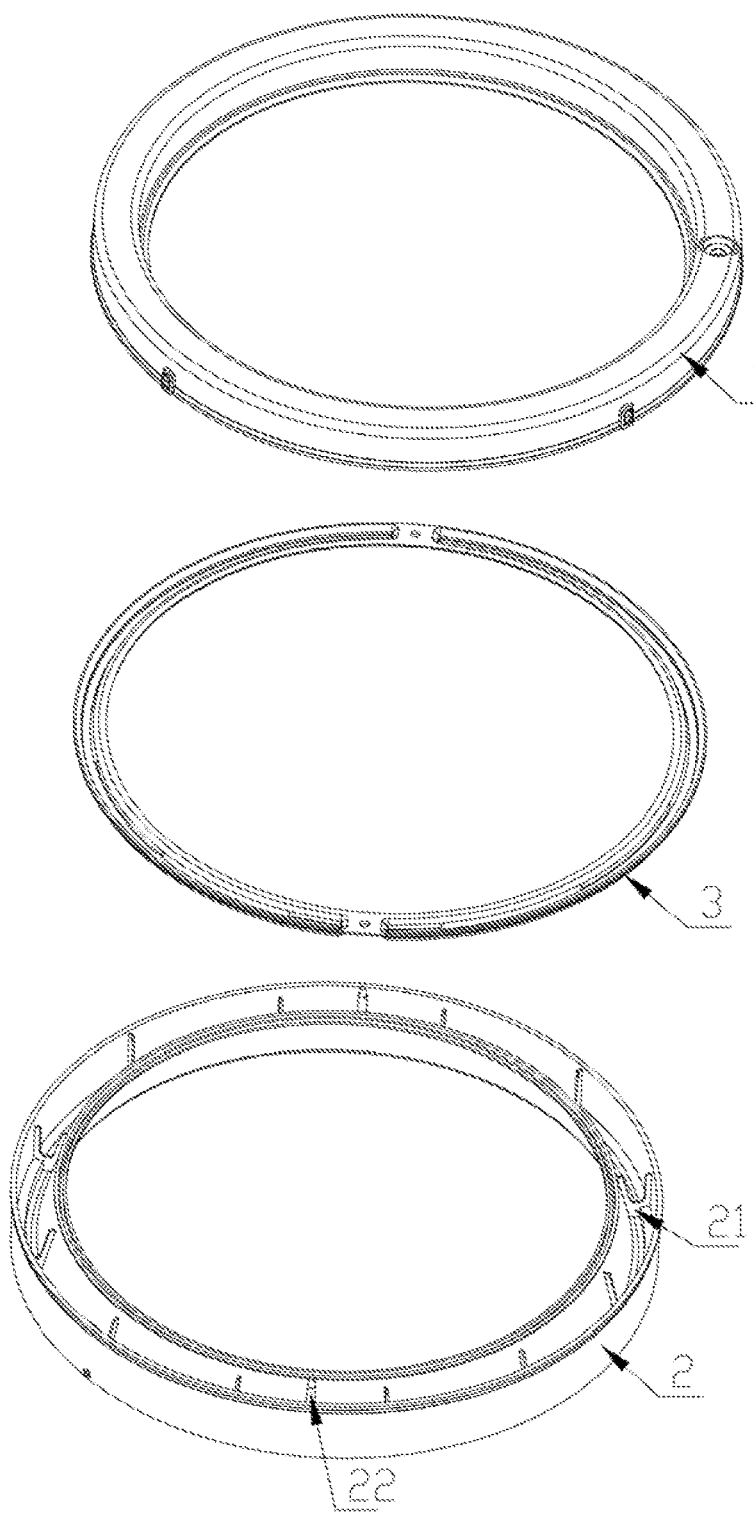
FIG. 1 is an exploded schematic view of a structure of a balance ring of the present disclosure.
Figure 2:
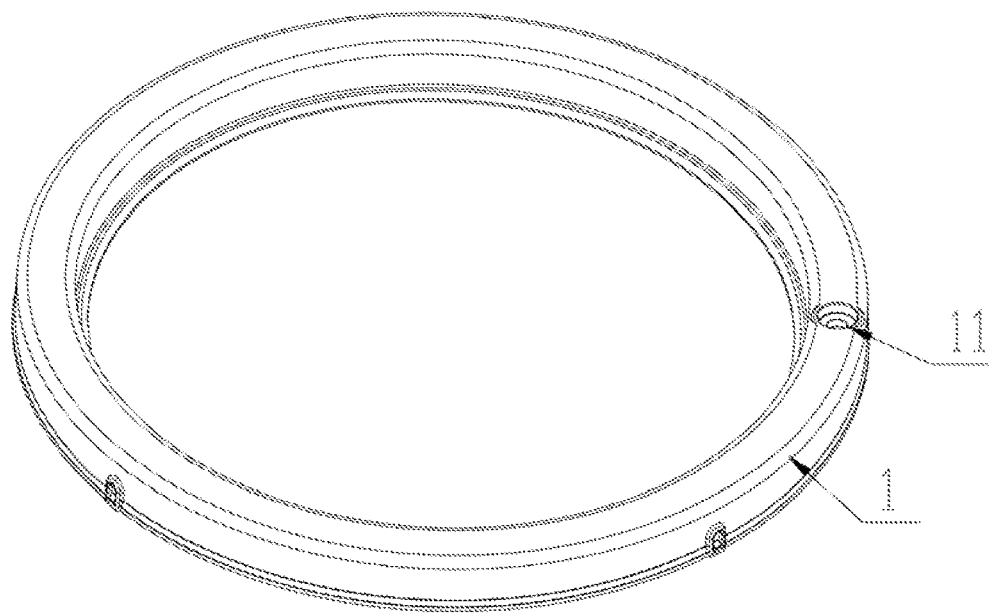
FIG. 2 is a schematic diagram of an upper balance ring.
Figure 4:
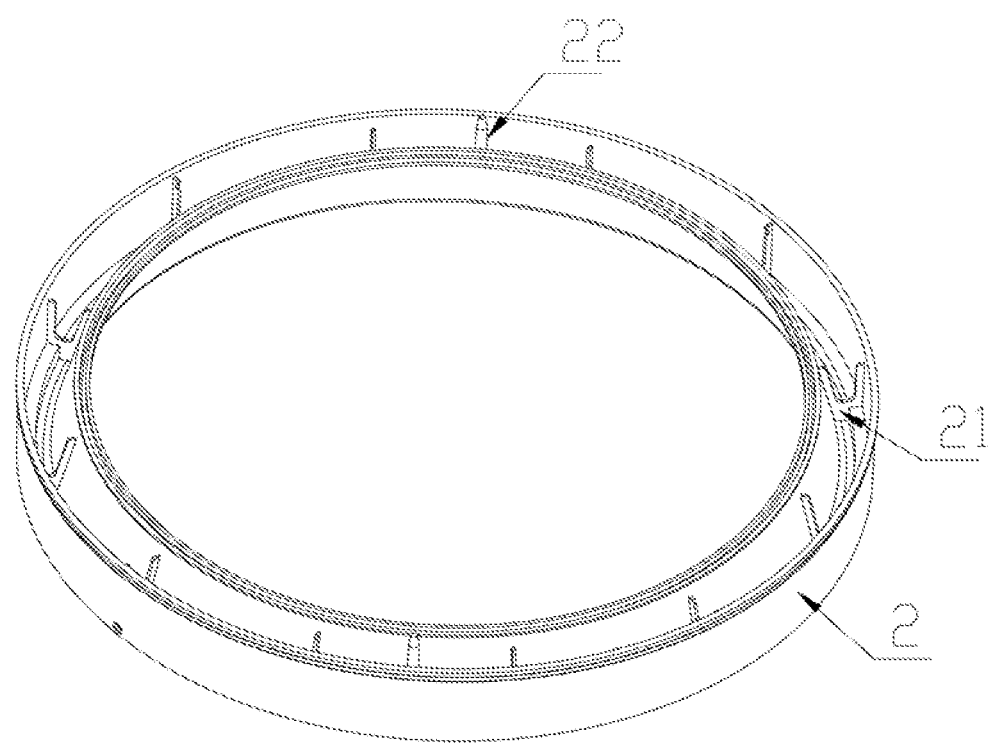
FIG. 4 is a schematic diagram of a structure of a lower balance ring.
Figure 5:
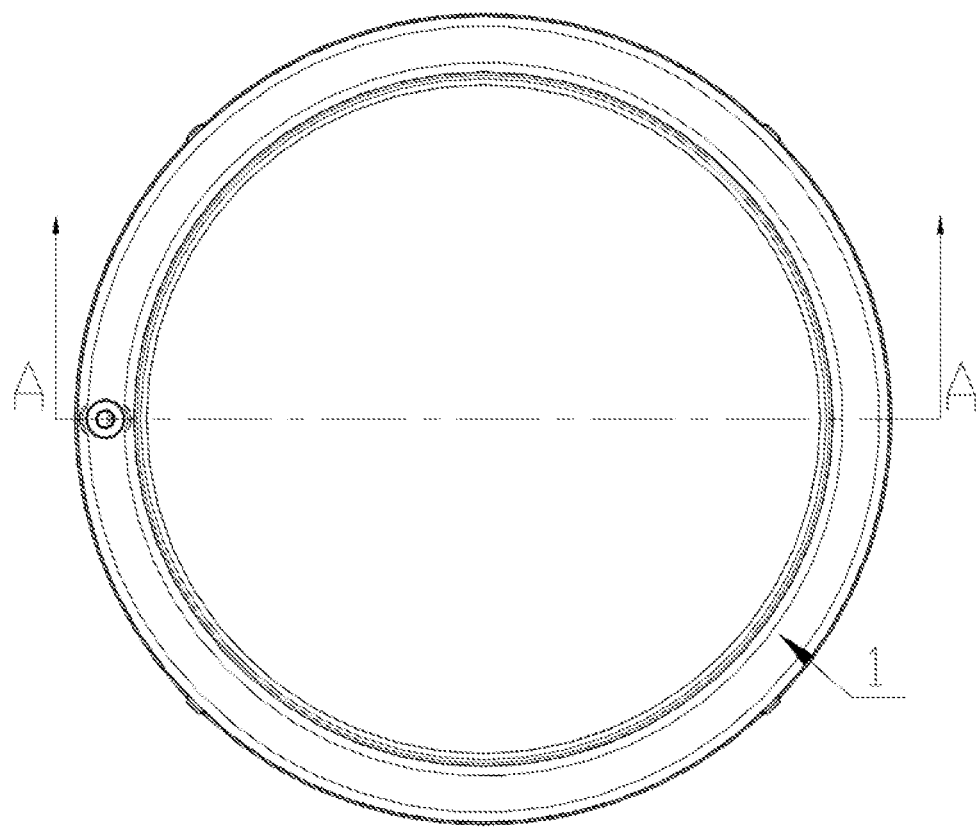
FIG. 5 is a schematic diagram of a structure of a balance ring of the present disclosure.

As shown in FIG. 2 and FIG. 4, the upper case 1 and the lower case 2 are each made of an annular plate having a " 凹 " shape in cross section. The upper case 1 and lower case 2 are snapped fit to each other and the openings of the " 凹 " shaped annular plates which constituting the upper case 1 and the lower case 2 are opposite set, and which form the annular balance ring having a "□" shape in cross section. The hollow portion of the balance ring foil is an annular chamber 4. A filling port 11 is arranged on the balance ring, which is used to fill balancing liquid into the chamber 4 of the balance ring, and the balancing liquid is composed of brine. The filling port 11 is arranged at a bottom center of the " 凹 " shaped annular plate which constituting the upper case 1. The filling port 11 is a through-hole and is provided with a detachable cover cooperating with the filling port 11 to ensure the tightness of the chamber 4 of the balance ring.

The chamber 4 of the balance ring is horizontally provided with a partition plate 3 dividing the chamber 4 into two parts, an upper chamber 41 and a lower chamber 42. Preferably, the partition plate 3 is provided at a snap-fit connection between the upper case 1 and the lower case 2. The height of the balancing liquid level filled in the chamber 4 is close to the height of the partition plate 3 so that the difference between the height of the balancing liquid level and the height of the partition plate is not more than one fifth of the height of the chamber. Preferably, the balancing liquid level is flush with the lower surface of the partition plate 3.

Figure 3:
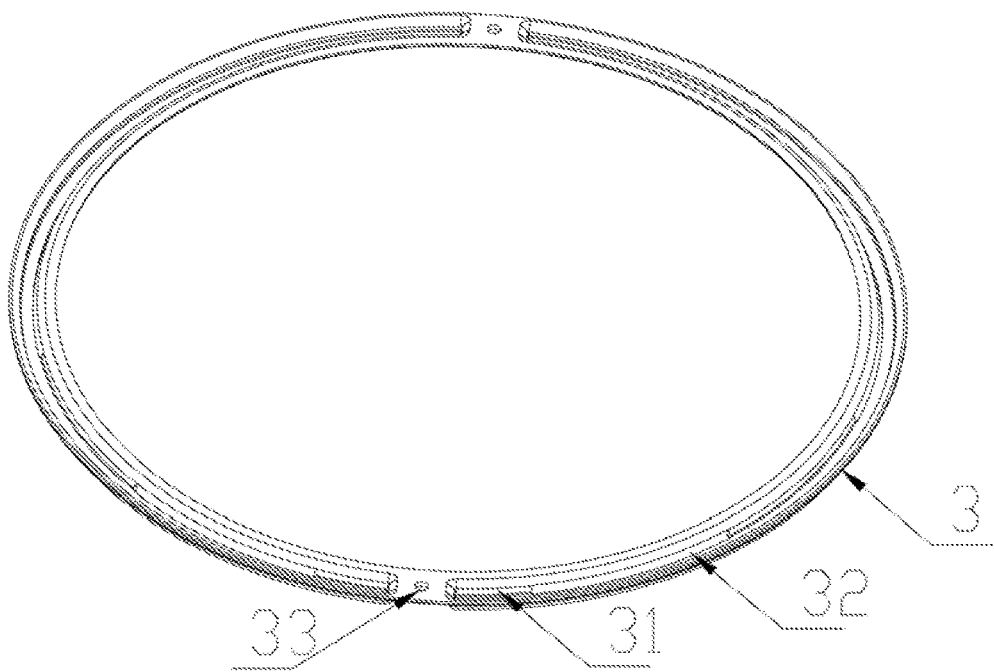
FIG. 3 is a schematic diagram of a structure of a partition plate.

As shown in FIG. 3, the partition plate 3 is constituted by an annular plate material cooperating with the chamber 4. The inner peripheral wall of the partition plate 3 is fitted to the inner peripheral wall of the chamber 4 so that the inner peripheral wall of the partition plate 3 is brought into close contact with the inner peripheral wall of the chamber 4. The outer peripheral diameter of the partition plate 3 is slightly smaller than the peripheral diameter of the outer peripheral wall of the chamber 4 so that an overflow gap 43 is formed between the outer peripheral side of the partition plate 3 and the outer peripheral wall of the chamber 4 to communicate the upper and lower chambers. The width of the overflow gap 43 is not greater than one fifth of the width of the chamber 4; that is, the width of the overflow gap 43 is not greater than one fourth of the width of the partition plate 3.

An annular groove 31 is provided on the partition plate 3 in the axial direction and projecting downwardly so as to form an annular balancing liquid flow. The bottom of the groove 31 is provided with backflow ports 32 communicating with the upper and lower chambers, and the backflow ports 32 are provided at a lowermost bottom of the groove 31. Preferably, the groove 31 is provided with at least two arc-shaped backflow ports 32, each of backflow ports 32 is symmetrically disposed with respect to a center of the balance ring.

Preferably, the annular plate material constituting the partition plate 3 are inclined from the inner peripheral wall and the outer peripheral wall to the bottom of the groove 31 provided thereon. So that the balancing liquid overflowing into the upper chamber 41 can be returned to the lower chamber 42 by gravity after the washing machine stops dehydration and the inner tub gradually stops rotating.

A washing machine with the balance ring at start-up in a dehydration process easily suffers an eccentric displacement of the inner tub due to the uneven distribution of the loads. The balance ring is driven to be eccentric and inclined, so that the balancing liquid in the lower chamber of the balance ring is collected in the inclined direction and overflows into the upper chamber through the overflow structure constituted by the overflow gap between the outer periphery of the partition plate and the chamber. However, the gap constituting the overflow structures is narrow, the overflow speed of the balancing liquid is relatively slow. Thus, the balancing liquid remaining in the lower chamber is provided with a counterweight force to the inner tub to avoid the occurrence of an increase in the eccentric displacement of the inner tub due to eccentric flow of the inner tub.

After the start-up of the dehydration, the balancing liquid remaining in the lower chamber rotates with the inner tub so that the balancing liquid under the action of centrifugal force is discharged through the overflow structure to the upper chamber. As the dehydrating progresses of the washing machine, the balancing liquid in the lower chamber gradually overflows into the upper chamber and flows close to the outer periphery wall of the partition plate to provide eccentricity correction force for the eccentricity of the inner tub.

After completing the dehydration process of the washing machine, the balancing liquid in the upper chamber is collected in the groove provided in the partition plate and returns to the lower chamber through the backflow port provided on the side wall of the groove near one side wall of the balance ring.

Embodiment 1

In the present embodiment, the balance ring is provided with retaining ribs protruding into the chamber to increase the resistance of the balancing liquid flowing in the balance ring and to improve the eccentricity correction effect.

Figure 7:
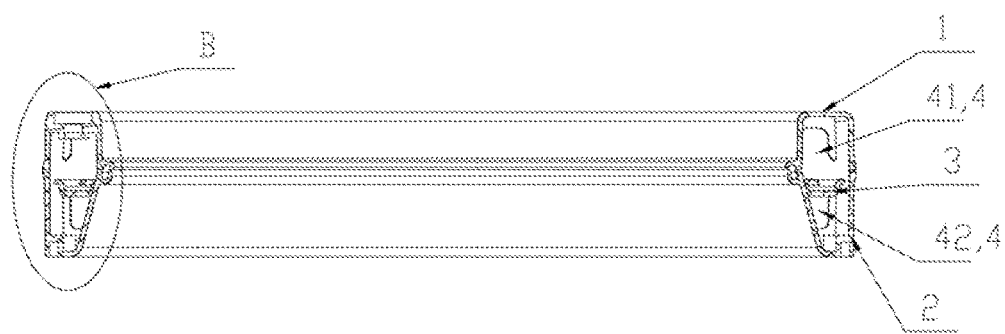
FIG. 7 is an A-A side sectional view of FIG. 5 of the present disclosure.
Figure 8:
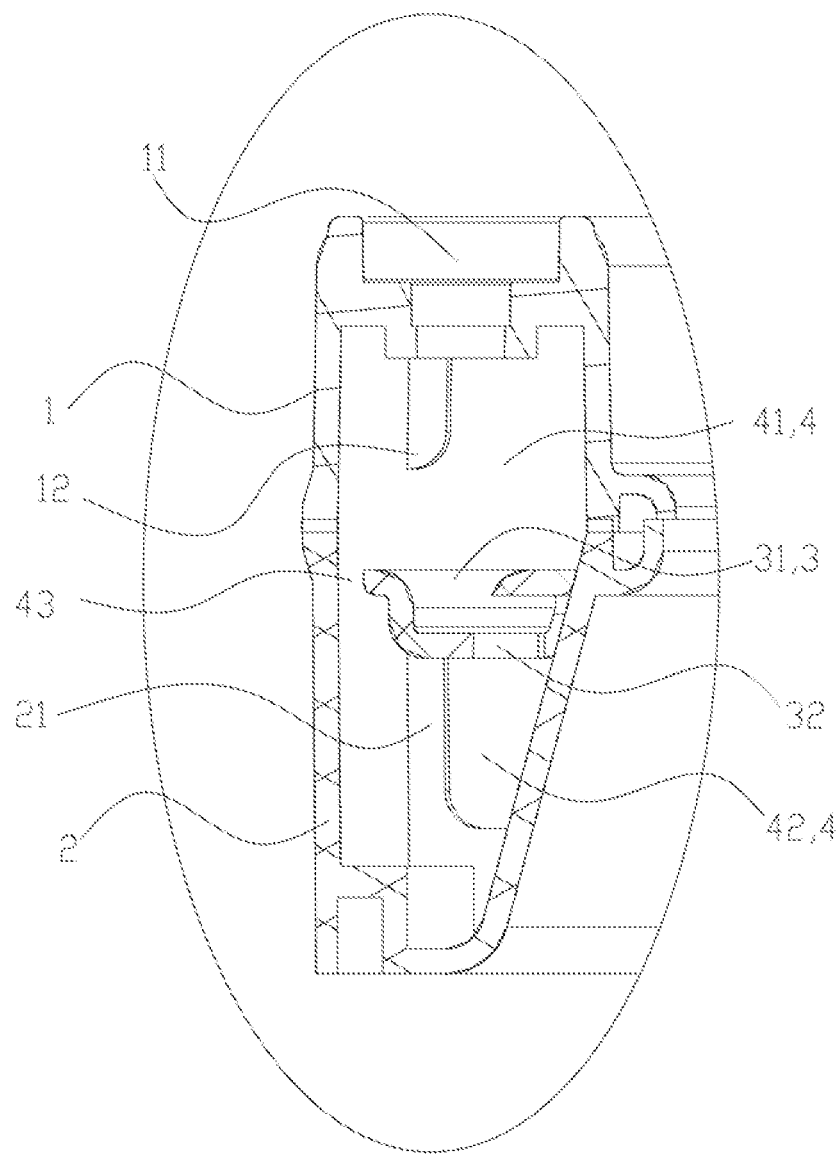
FIG. 8 is an enlarged schematic diagram of B part in FIG. 7 of the present disclosure.

As shown in FIG. 7 and FIG. 8, in the present embodiment, the retaining ribs include a plurality of lower retaining ribs 21 arranged on the lower case 2. The lower retaining ribs 21 are arranged along a radial direction of the balance ring and symmetrically with respect to the center of the balance ring. The lower retaining ribs 21 are constituted by "U"-shaped ribs projecting from the inner ring wall of the lower case 2 into the chamber 4 and arranged along the balance ring radially. An opening of the "U"-shaped ribs are provided toward the opening of the "凵"-shaped annular plate constituting the lower case. When the washing machine rotates in the dehydration process, a portion of the balancing liquid in the lower chamber 42 passes through the lower retaining ribs 21 from the opening of the lower retaining ribs 21 and the other portion is blocked by the lower retaining ribs 21 to form the eccentricity correction force of the inner tub. Preferably, the retaining ribs further comprise a plurality of upper retaining ribs 12 disposed symmetrically with respect to the center of the balance ring in the upper case 1. The upper retaining ribs 12 are provided on the inner wall of the outer periphery of the upper chamber 41 and extend in the radial direction of the balancing ring toward the chamber. Thus provides a blocking force to the balancing liquid flowing clingingly on the inner wall of the outer periphery of the upper chamber 41 and improve the eccentricity correction force of the balance ring, when the washing machine is in the dehydration process.

As shown in FIG. 8, in the present embodiment, the partition plate 3 is attached on the opening of the lower retaining ribs 21. Preferably, the width of the groove 31 provided in the partition plate 3 is smaller than the width of the opening of the lower retaining ribs 21. An opening height of the lower retaining rib 21 is slightly lower than an opening height of the lower case 2. The opening of the lower retaining ribs 21 are all in a same horizontal plane. Thus, the partition plate 3 is placed in a horizontal state after being placed on the opening of the lower retaining ribs 21 to avoid causing an unbalance in the overall balance ring.

Embodiment 2

Figure 9:
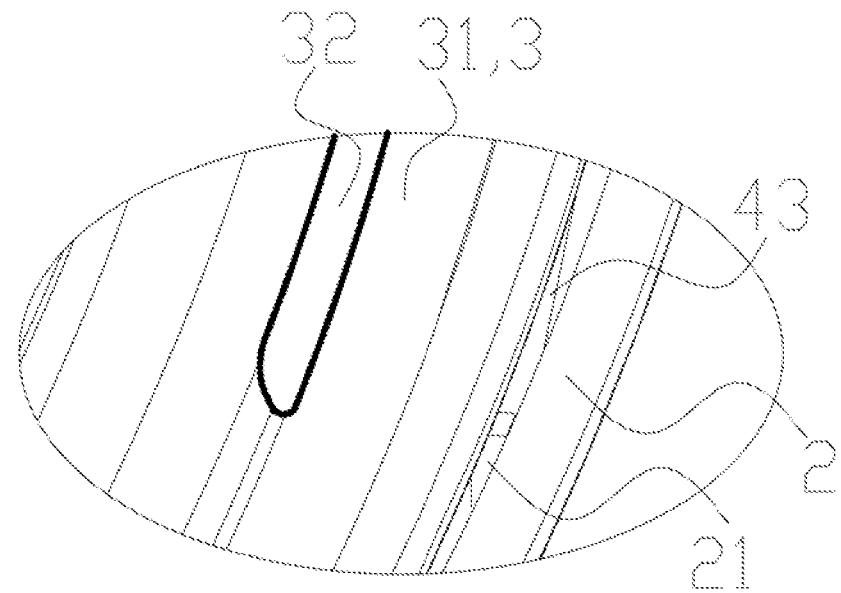
FIG. 9 is an enlarged schematic diagram of C part in FIG. 6 of the present disclosure.

As shown in FIG. 9, in the present embodiment, the partition plate 3 is provided with an annular groove 31 in a circumference therein to form a flow path for the balancing liquid. The width of the groove 31 is not less than one-half the width of the partition plate; the depth of the groove is not more than one-fifth of the depth of the lower chamber 4. The backflow port 32 is provided at the bottom of the groove 31 near the center of the balance ring. In the present embodiment, the partition plate 3 is provided with a plurality of backflow ports 32, and the axes of the backflow ports 32 extend in the direction of the side wall of the groove 31. Preferably, the backflow ports 32 are symmetrically distributed with respect to the center of the balance ring.

As shown in FIG. 8, in the present embodiment, the side wall of the groove 31 near the center of the balance ring is in contact with the inner peripheral wall of the chamber 4. The bottom of the groove 31 connected to the side wall of the groove 31 near the center of the balance ring is provided with backflow ports 32. The width of the backflow port 32 is not less than one-third of the width of the bottom of the groove 31 and not more than one-half of that.

Embodiment 3

Figure 6:
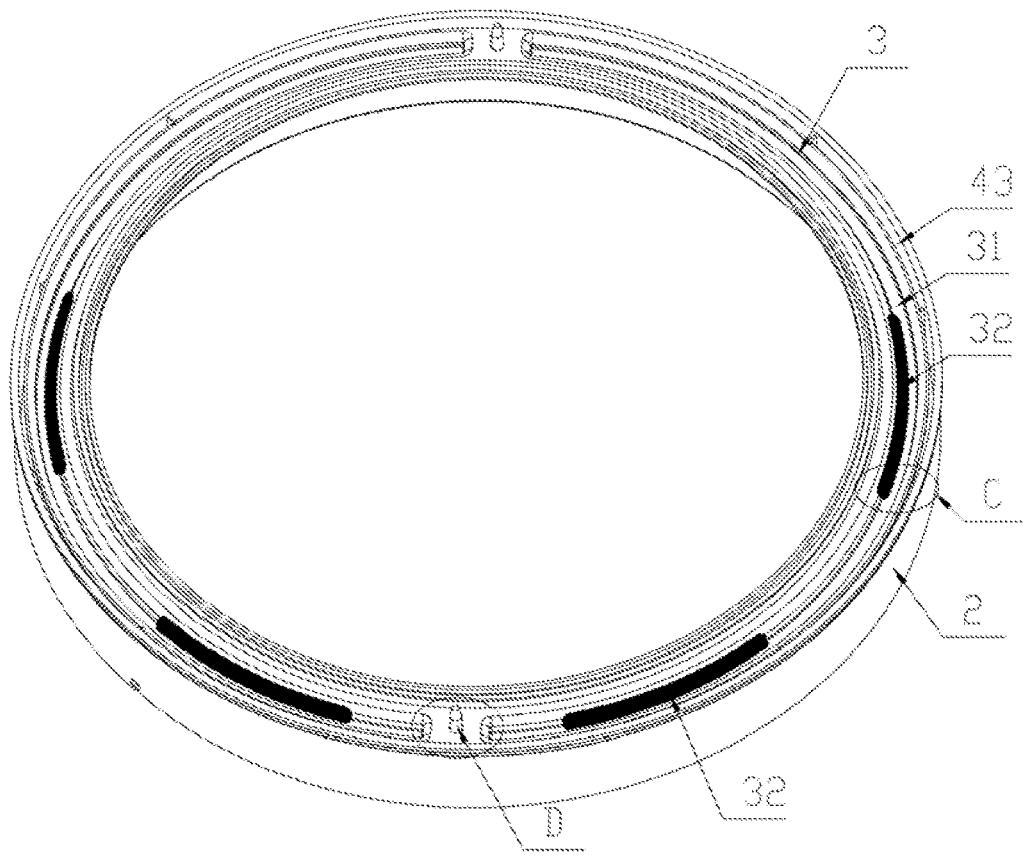
FIG. 6 is an installation diagram of the balance ring and the partition plate of the present disclosure.

As shown in FIG. 6, in the present embodiment, the partition plate 3 is placed on the lower retaining ribs 21 provided in the lower case 2.

Figure 10:
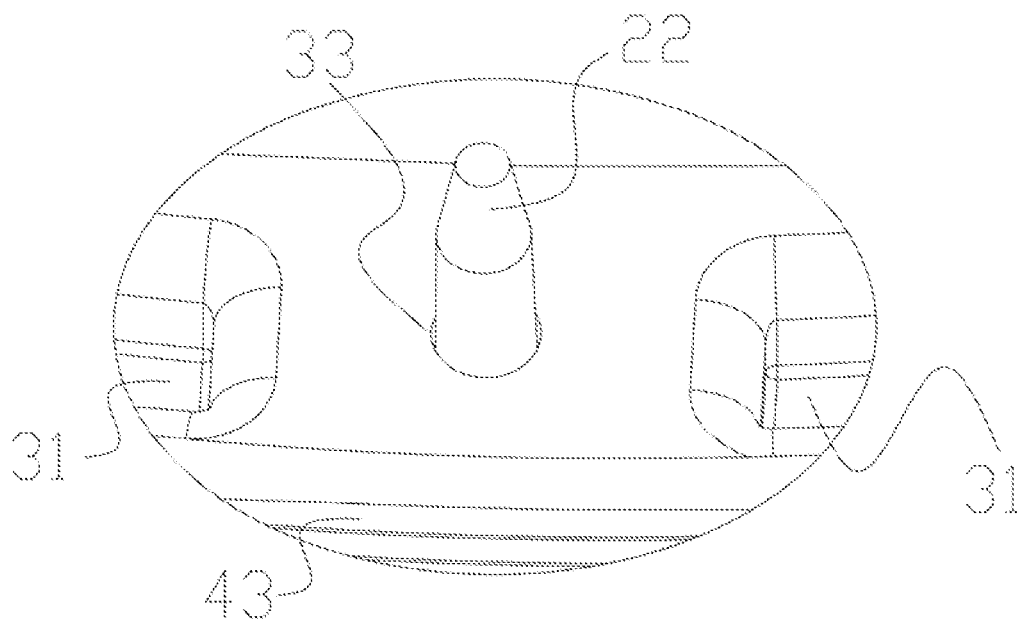
FIG. 10 is an enlarged schematic diagram of D part in FIG. 6 of the present disclosure.

As shown in FIG. 10, in the present embodiment, a mounting pillar 22 is provided in the lower case 2 which form a pin shaft connection with the partition plate 3. The mounting pillar 22 is formed by cylindrical protrusions extending vertically from the bottom of the lower case 2 into the chamber 4. Preferably, the cross-sectional radius of the mounting pillar 22 is gradually increased from a top to a bottom. A mounting hole 33 to be fitted to the mounting pillar 22 is provided on the partition plate 3, the partition plate 3 is fitted to the mounting pillars 22 through the mounting hole 33 to realize positioning in the horizontal direction of the upper portion of the retaining ribs.

The above description is only preferred embodiments of the disclosure but not intended to be limited to the spirit and scope of the present disclosure. It should be noted that without departing from the design concept of the present disclosure, various variations and improvements made to the technical solutions of the present disclosure by persons skilled in the art all belong to the protection scope of the present disclosure.

The invention claimed is:

1. A composite balance ring, which is internally hollow to form a chamber, wherein,
    the chamber is horizontally provided with a partition plate which divides the chamber into an upper chamber and a lower chamber,
    the upper chamber and the lower chamber are communicated through an overflow structure and a backflow structure,
    and the chamber is filled with balancing liquid with a liquid level close to the partition plate,
    the overflow structure is arranged further away from a center of the balance ring than the backflow structure,
    the overflow structure forming an overflow gap which is between an outer periphery of the partition plate and a side wall of the chamber,
    the overflow gap configured to allow the balancing liquid in the lower chamber to overflow to the upper chamber, the backflow structure is constituted by a backflow port provided near an inner periphery of the partition plate,
    the backflow port configured to allow the balancing liquid which overflows to the upper chamber to flow back to the lower chamber through the backflow port.

2. The composite balance ring according to claim 1, wherein the backflow port is arranged at a bottom of the groove near the center of the balance ring.

3. The composite balance ring according to claim 1, wherein a balancing liquid level in the chamber is flush with the partition plate.

4. The composite balance ring according to claim 3, wherein the lower chamber is provided with a plurality of lower retaining ribs arranged centrosymmetrically with respect to the balance ring,
    the partition plate is arranged on the retaining ribs.

5. The composite balance ring according to claim 4, wherein a positioning structure is arranged between the partition plate and the lower chamber so that the partition plate is fixedly mounted on the retaining ribs.

6. The composite balance ring according to claim 5, wherein the positioning structure comprises a mounting pillar provided on the lower chamber and a mounting hole provided in the partition plate,
    the mounting pillar is cylindrical protrusion extending vertically upwardly from a bottom of the lower chamber, and the partition plate is arranged on the mounting pillar through the mounting hole to realize the horizontal positioning on the retaining ribs.

7. A washing machine with the composite balance ring according to claim 1.

8. The composite balance ring according to claim 1, wherein the partition plate is provided with an annular groove, and the backflow port is provided at a bottom of the annular groove.

9. The composite balance ring according to from claim 2, wherein a balancing liquid level in the chamber is flush with the partition plate.

\* \* \* \* \*